US010420019B1

(12) United States Patent
Abdel Shahid et al.

(10) Patent No.: US 10,420,019 B1
(45) Date of Patent: Sep. 17, 2019

(54) BANDWIDTH-BASED SEARCH ORDER FOR CELL DISCOVERY

(71) Applicant: T-Mobile USA, Inc., Bellevue, WA (US)

(72) Inventors: Wafik Abdel Shahid, Kenmore, WA (US); Thomas P. Lucht, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/964,759

(22) Filed: Apr. 27, 2018

(51) Int. Cl.
*H04W 4/00* (2018.01)
*H04W 48/16* (2009.01)
*H04W 48/06* (2009.01)
*H04W 72/04* (2009.01)
*H04W 84/04* (2009.01)

(52) U.S. Cl.
CPC .......... *H04W 48/16* (2013.01); *H04W 48/06* (2013.01); *H04W 72/0453* (2013.01); *H04W 84/045* (2013.01)

(58) Field of Classification Search
None
See application file for complete search history.

(56) References Cited

U.S. PATENT DOCUMENTS

| | | | |
|---|---|---|---|
| 2002/0193112 A1* | 12/2002 | Aoki | H04W 48/20 455/437 |
| 2010/0220652 A1 | 9/2010 | Ishii | |
| 2012/0034917 A1 | 2/2012 | Kazmi | |
| 2012/0129548 A1* | 5/2012 | Rao | H04W 64/00 455/456.1 |
| 2015/0181530 A1 | 6/2015 | Lee et al. | |
| 2016/0157168 A1* | 6/2016 | Xue | H04W 4/029 370/329 |
| 2017/0111914 A1 | 4/2017 | Chen et al. | |

OTHER PUBLICATIONS

PCT Search Report and Written Opinion dated Jul. 26, 2019, for PCT Application No. PCT/US2019/025861, 10 pages.

* cited by examiner

*Primary Examiner* — Zewdu A Beyen
(74) *Attorney, Agent, or Firm* — Lee & Hayes, P.C.

(57) ABSTRACT

Described herein are devices, components, and techniques for performing cell discovery by a cellular communication device. Prioritization data is stored by the communication device indicating, for each of multiple geographic regions, the bandwidths of frequency bands that are potentially available to the communication device. The communication device determines an order in which to search the frequency bands based on this prioritization data. For example, frequency bands having relatively high aggregate bandwidths may be prioritized over frequency bands having relatively lower aggregate bandwidths. In some cases, the priority of the frequency bands may be determine algorithmically based on the bandwidths of the frequency bands, and in some situations a lower bandwidth band may be prioritized over a higher bandwidth band.

16 Claims, 5 Drawing Sheets

| Latitude | Region | Band 71 | Band 12 | Band 2 | Band 4 |
|---|---|---|---|---|---|
| 33-36 | Carolinas | 40 MHz | 12 MHz | 35 MHz | 70 MHz |
| 29-32 | LA | 50 MHz | 12 MHz | 30 MHz | 60 MHz |
| 51.86-41.89 | Chicago | 40 MHz | 12 MHz | 46 MHz | 50 MHz |
| ... | ... | ... | ... | ... | ... |
| 33.44-33.5 | Phoenix | 30 MHz | 12 MHz | 35 MHz | 30 MHz |

Fig. 3

| Latitude | Region | Band 71 | Band 12 | Band 2 | Band 4 |
|---|---|---|---|---|---|
| 33-36 | Carolinas | 2 | 4 | 3 | 1 |
| 29-32 | LA | 2 | 4 | 3 | 1 |
| 51.86-41.89 | Chicago | 3 | 4 | 2 | 1 |
| ... | ... | ... | ... | ... | ... |
| 33.44-33.5 | Phoenix | 2 | 4 | 1 | 3 |

BANDWIDTH-BASED SEARCH ORDER FOR CELL DISCOVERY

BACKGROUND

A cellular communication device may support several frequency bands, including bands that are referred to as 600 MHz, 700 MHz, 1700/2100 MHz, 1900 MHz, etc. Multiple frequencies are used in each band for multiple RF signals.

When a cellular handset is turned on, it scans available frequencies in each of multiple supported frequency bands to find a satisfactory signal and cell, and to then begin an attach procedure. This involves tuning an RF receiver to each of multiple radio frequencies in turn, and evaluating received signal strengths at each frequency.

A cellular communication device is typically configured to operate within a network of a particular provider, and therefore searches for a signal that corresponds to a cell of the provider. Searching continues until a suitable or acceptable cell is identified. This process can take significant time, during which the device cannot be used for cellular communications.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Described herein are devices, systems, and methods for use in conjunction with a cellular communication network, to allow a cell phone or other cellular communication device to more quickly identify a suitable or acceptable cell to use for initial attachment to the cellular communication network.

In accordance with techniques that are described in more detail below, the communication device is configured to initially obtain a prioritized search order in which to search frequency bands for cell discovery, where the order is dependent on the geographic location of the communication device. The order may be determined for a given geographic region based on which frequency bands are available in that region and the aggregate bandwidths supported by those frequency bands.

As an example, the search order might be defined or determined based on available aggregate bandwidths provided in different geographic regions by the home Public Land Mobile Network (PLMN) of the communication device, where frequency bands having higher available aggregate bandwidths are prioritized over frequency bands having lower available bandwidths. In these embodiments, for example, a frequency band in which the communication network provides bandwidth of 70 MHz is searched prior to a frequency band in which the communication network provides bandwidth of 50 MHz.

In some embodiments, other factors might also be considered when selecting a search order for frequency bands in a given geographic region. For example, a relatively higher bandwidth might be needed when using a first frequency band to provide the same level of performance that a second frequency band might provide with a lower bandwidth. To account for this, the first frequency band might be selected over the second frequency band only if the bandwidth of the first frequency band is greater than the bandwidth of the second frequency band by a predetermined threshold. As an example, the GHz frequencies of the 1700/2100 MHz band tend to result in less reliable communications than the lower frequencies of the 600 MHz band. Because of this, the 1700/2100 MHz band might be selected only if its available bandwidth is at least 10 MHz greater than that of the 600 MHz band.

Furthermore, in some embodiments the prioritization of frequency bands may be determined algorithmically, based on available bandwidths, to give preferences in some cases to certain frequency bands that do not have the highest bandwidths.

In implementation, the communication device may be configured to store a data table indicating characteristics or relative priorities of supported frequency bands in each of multiple geographic regions. During cell discovery, the communication device determines its location using Global Positioning System (GPS) capabilities, and then refers to the stored table to determine, for the determined location, the order in which to search the frequency bands. The communication device then begins scanning the frequency bands in the determined order.

In some embodiments, the data table may explicitly indicate, for each of multiple geographic regions, an order in which the frequency bands should be scanned, where the order is based on bandwidths of the frequency bands as described above. In other embodiments, the data table might indicate bandwidths that are available from the home PLMN in each geographic region, and the communication device might then select the frequency band having the highest available bandwidth at the current location of the communication device. In some cases, the selection may account for relative advantages and disadvantages of the different frequency bands.

Figure 1:
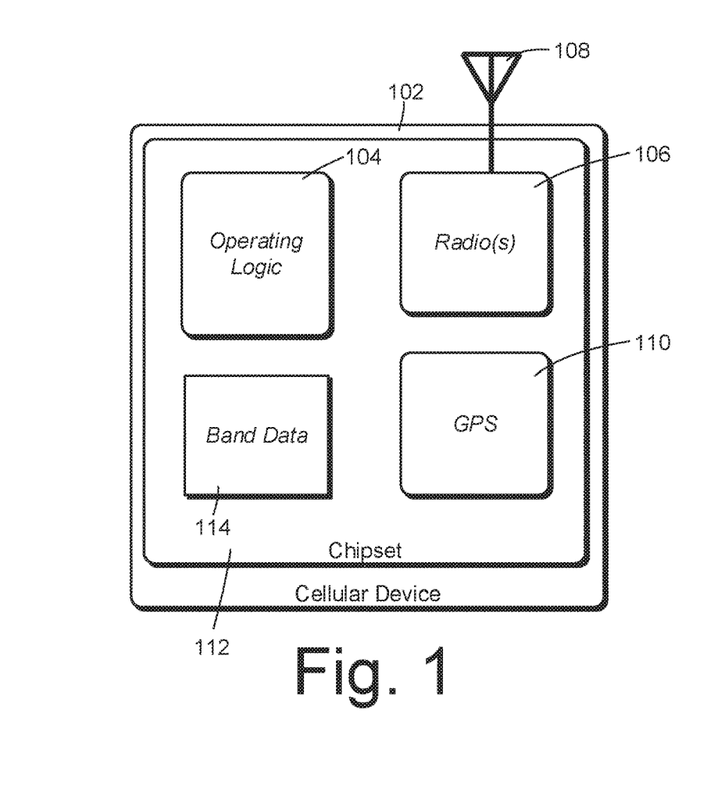
FIG. 1 is a block diagram illustrating relevant components of a cellular communication device in which the described techniques may be implemented.

FIG. 1 illustrates relevant high-level components of a cellular communication device 102 that may be configured to implement the techniques described herein. The communication device 102 has operating logic 104, which may comprise a processing unit, memory, and supporting components that are not shown. The device 102 also has one or more radios 106 and one or more associated antennas 108, which are used to transmit and receive radio frequency (RF) signals of different frequencies. The device 102 may also have a global positioning system (GPS) receiver 110 that can be used by the operating logic 104 to determine the location of the device 102 in terms of geographic coordinates such as longitude and latitude.

The illustrated components may in some embodiments be implemented by an integrated circuit or by a chipset 112, comprising one or more integrated circuits. A chipset is also referred to at times as a System-On-Chip (SOP).

The device 102 may be provisioned for an associated home PLMN and designed to transmit and receive RF signals on multiple frequency bands used by the home PLMN. The frequency bands have standardized numbers that are used for reference. For example, band 71 (B71) refers a 600 MHz band. Band 2 (B2) refers to a 1900 MHz band. Band 4 (B4) refers to a 1700/2100 MHz band. Band 12 (B12) refers to a 700 MHz band. Note that these frequency designations are used as references to the corresponding bands, rather than as exact specifications of the frequencies of the bands.

For purposes of discussion, it will be assumed that the device 102 is designed and provisioned to communicate using frequencies within any of bands 2, 4, 12, and 71, corresponding to bands supported by the communication device 102 and the home PLMN of the communication device 102. However, different devices may be configured to use different combinations of various frequency bands, not limited to the four discussed here.

In some embodiments, the device 102 may have what is referred to herein as band data 114, specifying configuration information regarding the frequency bands that the communication device 102 is designed or provisioned to use. When the device 102 starts up, it scans the frequencies of these bands to detect sufficiently strong signals from its home PLMN, in a process known as cell discovery. In addition to power-on, the cell discovery may be performed whenever communication capabilities of the device are enabled, such as when moving from an area without cell coverage to an area with cell coverage, when leaving "airplane" mode, when leaving idle mode, etc.

Upon finding a satisfactory signal, the device 102 attempts an attach procedure with the PLMN using the signal.

Frequency scanning and signal searching can take significant time, especially when the device 102 begins its search in a frequency band that is not supported by the home PLMN at the location of the device 102.

In order to lessen the time to find a satisfactory frequency band, the band data 114 may indicate the order in which the frequency bands should be searched. For example, the band data 114 may specify that the device 102 is to first search band 4, then band 71, then band 2, and finally band 4. The search may end at any time when the device 102 locates a satisfactory signal.

In embodiments described herein, different search orders may be specified for different geographic locations. For example, in Seattle, Wash., the search order might start with band 2, because the device 102 is likely to more quickly find a satisfactory signal in band 2 than in other potentially available bands. In San Francisco, Calif., however, the search order might start with band 4, because in that location a search in band 4 is likely to more quickly discover a satisfactory signal.

In some embodiments, frequency bands may be prioritized based on the bandwidths available from the home PLMN in each region. The band having the highest bandwidth might be searched first, followed by bands having progressively lower bandwidths.

Figure 2:
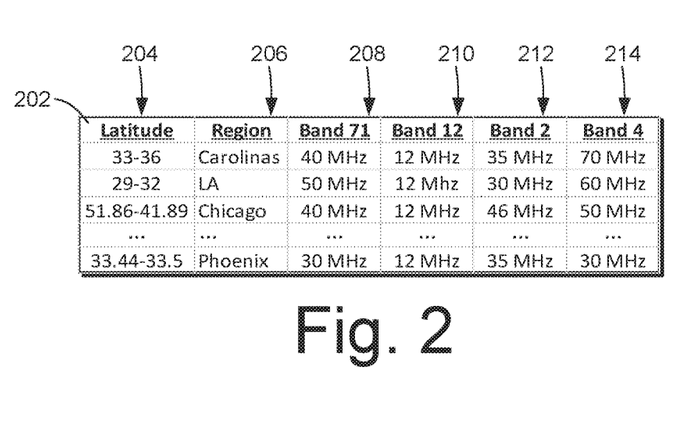
FIG. 2 is a diagram illustrating an embodiment of a prioritization data table that may be used by the cellular communication device.

FIG. 2 shows a band priority table 202 that may be part of the band data 114. The band priority table 202 specifies band prioritization data that is used by the communication device 102 during cell discovery to determine which of multiple potentially available frequency bands to search first. More generally, the table may be used to determine a search order of the multiple frequency bands based on the aggregate bandwidths of the frequency bands.

The table 202 has a latitude column 204 that for each row of the table 202 indicates a range of geographic latitudes. The latitude ranges are used to define geographic regions. The name of the corresponding region is shown in a region column 206, although the name may not be used by the device 102 in actual implementation.

The table 202 also has a Band 71 column 208, indicating, for each latitude range, the bandwidth that is available from the home PLMN of the device 102 in Band 71. The table 202 has a Band 12 column 210, indicating, for each latitude range, the bandwidth that is available from the home PLMN of the device 102 in Band 12. The table 202 has a Band 2 column 212, indicating, for each latitude range, the bandwidth that is available from the home PLMN of the device 102 in Band 2. The table 202 has a Band 4 column 214, indicating, for each latitude range, the bandwidth that is available from the home PLMN of the device 102 in Band 4.

In some embodiments, the device 102 may select the frequency band having the greatest bandwidth in the region in which the device 102 is located, and start with that band when performing initial access and cell selection. In other embodiments, a formula or algorithm may be used to select an initial frequency band, based on the bandwidths shown in the table 202 for the region in which the device 102 is located.

Figure 3:
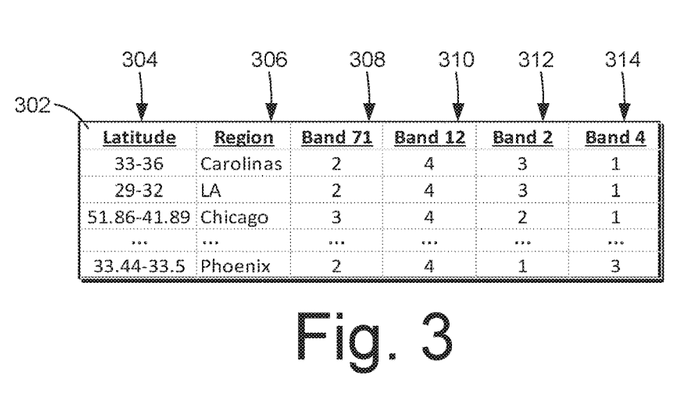
FIG. 3 is a diagram illustrating another embodiment of a prioritization data table that may be used by the cellular communication device.

FIG. 3 shows an alternative band priority table 302. In this case, rather than indicating bandwidths, the table 302 explicitly indicates a prioritized order in which potentially available frequency bands should be scanned. Like the table 202 of FIG. 2, the table 302 has a latitude column 304, a region column 306, a Band 71 column 308, a Band 12 column 310, a Band 2 column 312, and a Band 4 column 314. In this case, however, the columns indicate relative priorities of the bands for each latitude range. A "1" for a particular band indicates that that band should be searched $1^{st}$; a "2" for a band indicates that that band should be searched $2^{nd}$, if necessary; and so on until a satisfactory signal is located.

A communication device may be configured with band prioritization data at manufacture or sale. In some implementations, the band prioritization data may also be updated during operation of the communication device by sending new band prioritization data to the communication device.

Figure 4:
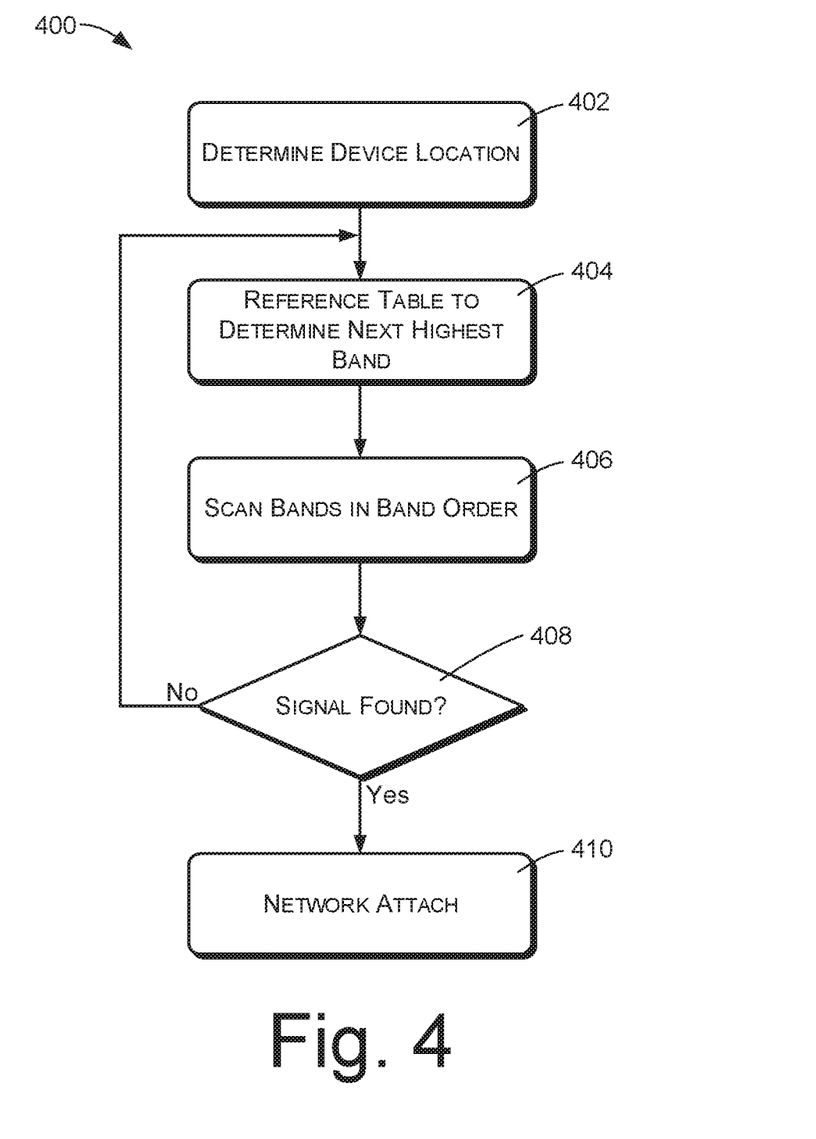
FIG. 4 is a flow diagram illustrating an example method of cell discovery by a cellular communication device.

FIG. 4 shows an example method 400 for searching frequency bands during cell discovery to find signals of a home PLMN of a cellular communication device. The example method 400 may be performed by the cellular communication device 102 in some embodiments, by the operating logic 104 of the cellular communication device, or by components of the chipset 112. The example method 400 may also be used in configurations other than the illustrated device configuration.

The example method 400 assumes the existence of band prioritization data, such as contained by the tables of FIG. 2 or FIG. 3, for each of multiple geographic regions.

An action 402 comprises determining the location of the communication device. In a described embodiment, the action 402 comprises determining one or more geographic coordinates of the communication device. For example, the action 402 may comprise determining a latitude and/or a longitude of the communication device, using the device's GPS receiver.

An action 404 comprises referencing band prioritization data to determine, for a current geographic location or coordinate(s) of the communication device, a prioritized frequency band for use during cell discovery.

As will be explained, the action 404, along with the subsequent action 406, are iterated until a satisfactory signal has been found. Accordingly, at each iteration the action 404 comprises finding the frequency band that has the next highest priority, after the frequency band identified in the previous iteration. This results in an ordered and prioritized sequence of frequency bands.

In one embodiment, the communication device may have band prioritization data in the form of a table such as shown in FIG. 2, which indicates bandwidths corresponding to each of multiple ranges of latitudes. In this embodiment, the action 404 may comprise using one or more geographic coordinates of the device 102 to look up a priority frequency band. Specifically, the action 404 may comprise (a) determining which of the latitude ranges of the prioritization data includes the current latitude of the communication device, (b) comparing the bandwidths corresponding to the determined latitude range, and (c) determining which of the frequency bands is specified by the band prioritization data as having the greatest bandwidth in a region corresponding to the latitude range.

In some cases, as will explained below with reference to FIG. 5 the action 404 may comprise determining an amount by which the bandwidth of a first band exceeds the bandwidth of a second band, and selecting the first band if the bandwidth of the first band exceeds the bandwidth of the second band by more than a predetermined threshold.

In other embodiments, the prioritization data may be as shown in FIG. 3, explicitly indicating an order in which the frequency bands are to be scanned. In this case, the action 404 may comprise selecting the band that is indicated as being first, or next, in the order for region in which the communication device is located.

An action 406 comprises scanning the frequencies of the selected or prioritized frequency band to identify signals of the device's home PLMN.

A decision block 408 indicates that the actions 404 and 406 are repeated until the device has found a satisfactory signal. Accordingly, the method 400 may result in scanning the frequencies of the multiple frequency bands, wherein the scanning is performed for frequencies of the prioritized frequency band before the scanning is performed for frequencies of other frequency bands.

In practice, the method 400 may terminate at any point after the scanning of a frequency band has started, which in some cases may be before all the frequencies of the frequency band have been scanned. That is, the method 400 may identify a satisfactory signal without scanning all the frequencies of the frequency band and without scanning all frequency bands.

If a satisfactory signal is identified, an action 410 is performed of initiating or performing an initial attachment procedure to connect to the home PLMN of the communication device.

Figure 5:
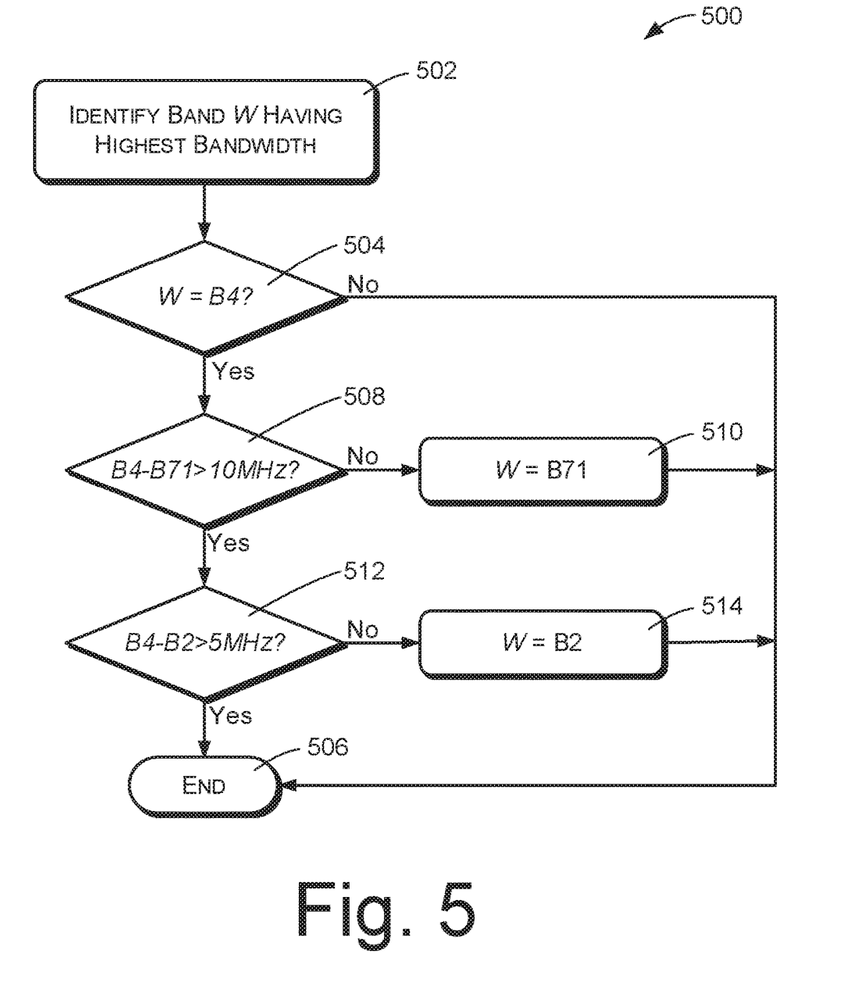
FIG. 5 is a flow diagram illustrating an example method of prioritizing frequency bands for cell discovery.

FIG. 5 illustrates an example method 500 of selecting which of multiple frequency bands to search first when attempting to identify a cell for initial attachment of a cellular communication device. The method 500 assumes that the four bands mentioned above, B2, B4, B12, and B71, are generally available from the home PLMN of the communication device, but that there might be different availability in different locations. The method 500 can be performed for each region of multiple regions to determine the order in which multiple frequency bands should be scanned when the communication device is in each region.

The method 500 can be implemented by the communication device itself, based on bandwidth information such as given by the table 202. Alternatively, the method 500 may be used to create the table 302.

An action 502 comprises identifying and selecting the frequency band having the highest bandwidth in a given geographic region. The variable W is used here to represent the selected frequency band.

An action 504 comprises determining whether B4 is the selected frequency band. If the selected frequency band W is other than B4, the method 500 ends as indicated by the termination block 506, and W is unchanged from the action 502.

If the selected frequency band W is B4, an action 508 is performed of determining whether the bandwidth of B4 is greater than the bandwidth of B71 by at least 10 MHz. In other words, the action 508 comprises determining whether the difference between the bandwidth of B4 and the bandwidth of B71 is greater than 10 MHz. If the difference is not greater than 10 MHz, an action 510 is performed of setting W to B71, so that B71 is now the selected bandwidth. The method 500 then ends at 506, with B71 being selected as the highest priority frequency band.

If the difference between the bandwidth of B4 and the bandwidth of B71 is greater than 10 MHz, an action 512 is performed of determining whether the bandwidth of B4 is greater than the bandwidth of B2 by at least 5 MHz. In other words, the action 512 comprises determining whether the difference between the bandwidth of B4 and the bandwidth of B2 is greater than 5 MHz. If the difference is not greater than 5 MHz, an action 514 is performed of setting W to B2, so that B2 becomes the selected bandwidth. The method 500 then ends at 506, with B2 being selected as the highest priority frequency band.

If the difference between the bandwidth of B4 and the bandwidth of B2 is greater than 5 MHz, the method 500 ends at 506, with W4 being selected as the highest priority frequency band.

The method 500 may be iterated to determine the order in which the bands will be searched. The first iteration is performed with respect to the set of four frequency bands. After each iteration, the selected band is removed from the set, and the next iteration is with respect to the remaining bands of the set. After each iteration, the selected band is added to an ordered band sequence in a position following the band that was selected in the previous iteration.

The method 500 may also be iterated to determine priority frequency bands and/or search orders for multiple geographic regions.

Figure 6:
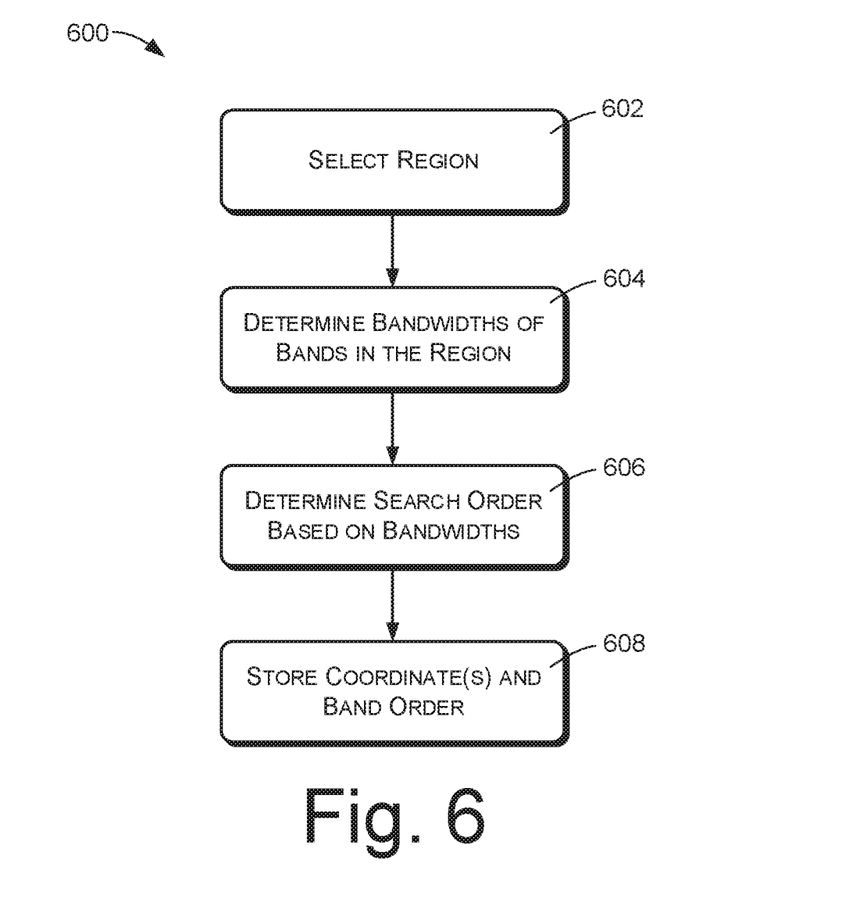
FIG. 6 is a flow diagram illustrating an example method of creating a prioritization data table.

FIG. 6 illustrates an example method 600 of generating prioritization data such as specified by the table 302 of FIG. 3. The method 600 may be performed by various components, including computers and servers of a device manufacturer, distributor, or retailer, to create the table 302 and/or to determine the prioritization data of the table 302. The prioritization data may be provided to a communication device upon manufacture, distribution, or sale. Alternatively, or additionally, the prioritization data may be provided to the communication device during its operation. In some implementations, the prioritization data may be provided to and stored by the communication device upon manufacture or distribution, with updates being sent to the communication device at later times while the device is in use.

An action 602 comprises selecting a geographic region. The geographic region may be specified in terms of one or more geographic coordinates, such as a latitude as described above.

An action 604 comprises determining bandwidths, in the selected region, for the frequency bands that are supported by a home PLMN. In some embodiments, this may be a manual step, based on information known to or obtained by the network provider.

An action 606 comprises determining a band search order for the selected region based at least in part on the bandwidths determined in the action 604. This determination may be made using the same techniques as described above with reference to the action 404 of FIG. 4. For example, in some implementations, the action 606 may comprise specifying an order in accordance with bandwidths of the frequency bands, starting at the frequency band having the highest bandwidth and continuing in order with bands having progressively lower bandwidths. In some implementations, an algorithmic approach may be used such as the method 500 of FIG. 5, where a band may be selected even when another band has a higher bandwidth.

An action 608 comprises storing the geographic coordinate(s) corresponding to the selected region along with the determined search order. As one example, the action 608 may comprise storing the coordinate(s) and corresponding band priorities as a row of the table 302 of FIG. 3.

Figure 7:
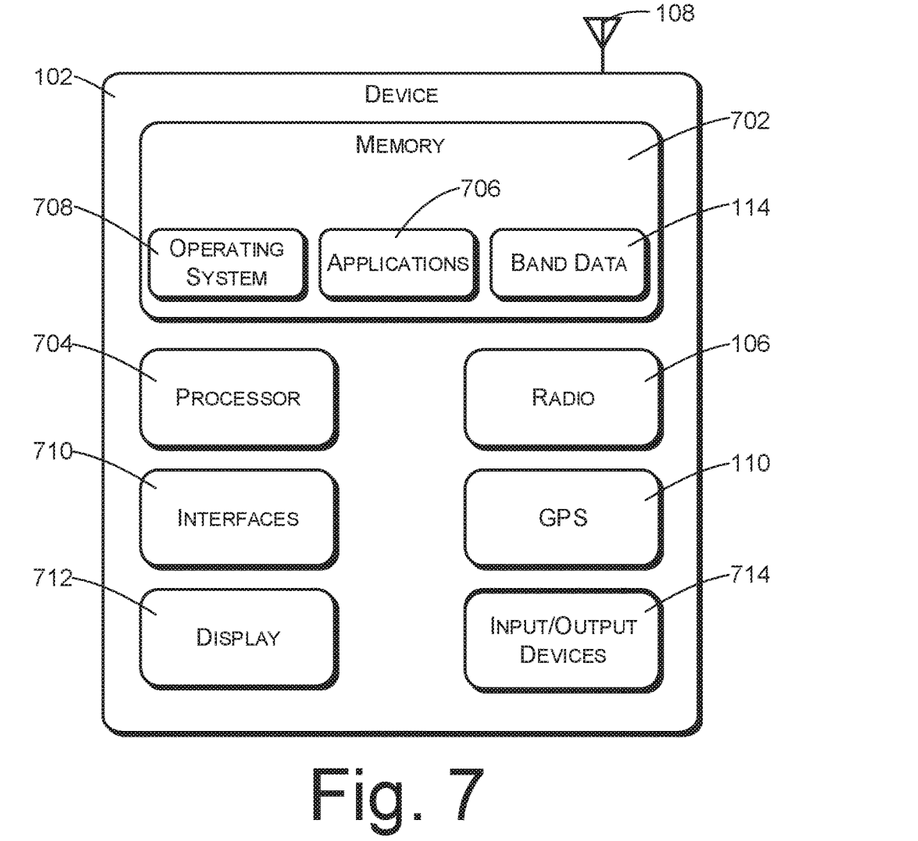
FIG. 7 is a block diagram of an example cellular communication device that may be configured to implement various components shown in FIG. 1, as well as the perform the example methods described herein.

FIG. 7 shows high-level components and further information regarding the device 102, which may be used to implement certain of the techniques described herein. The methods shown in FIGS. 4, 5, and 6, for example, may be implemented by the device 102. FIG. 7 shows only basic, high-level components of the device 102.

The device 102 may include memory 702 and a processor 704. The memory 702 may include both volatile memory and non-volatile memory. The memory 702 can also be described as non-transitory computer-readable media or machine-readable storage memory, and may include removable and non-removable media implemented in any method or technology for storage of information, such as computer executable instructions, data structures, program modules, or other data. Additionally, in some embodiments the memory 702 may include a SIM (subscriber identity module), which is a removable smart card used to identify a user of the device 102 to a service provider network.

The memory 702 may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information. The memory 702 may in some cases include storage media used to transfer or distribute instructions, applications, and/or data. In some cases, the memory 702 may include data storage that is accessed remotely, such as network-attached storage that the device 102 accesses over some type of data communication network.

The memory 702 stores one or more sets of computer-executable instructions (e.g., software) such as programs that embody the operating logic 104 of the device 102 for implementing and/or performing desired functionality of the device 102. The instructions may also reside at least partially within the processor 704 during execution thereof by the device 102. Generally, the instructions stored in the computer-readable storage media may include various applications 706 that are executed by the processor 704 and an operating system (OS) 708 that is also executed by the processor 704. The memory 702 may also store the band data 114.

In some embodiments, the processor(s) 704 is a central processing unit (CPU), a graphics processing unit (GPU), both CPU and GPU, or other processing unit or component known in the art. Furthermore, the processor(s) 304 may include any number of processors and/or processing cores. The processor(s) 704 is configured to retrieve and execute instructions from the memory 302.

The device 102 may have interfaces 710, which may comprise any sort of interfaces known in the art. The interfaces 710 may include any one or more of an Ethernet interface, wireless local-area network (WLAN) interface, a near field interface, a DECT chipset, or an interface for an RJ-11 or RJ-45 port. A wireless LAN interface can include a Wi-Fi interface or a Wi-Max interface, or a Bluetooth interface that performs the function of transmitting and receiving wireless communications. The near field interface can include a Bluetooth® interface or radio frequency identifier (RFID) for transmitting and receiving near field radio communications via a near field antenna. For example, the near field interface may be used for functions, as is known in the art, such as communicating directly with nearby devices that are also, for instance, Bluetooth® or RFID enabled.

The device 102 may also have a radio 106 as discussed above, which may be used in conjunction with the antenna 108 for communicating with a cellular communication network. The device 102 may include the GPS receiver 110 as described above, for determining a current positions of the device 102.

The device 102 may have a display 712, which may comprise a liquid crystal display or any other type of display commonly used in telemobile devices or other portable devices. For example, the display 712 may be a touch-sensitive display screen, which may also act as an input device or keypad, such as for providing a soft-key keyboard, navigation buttons, or the like.

The device 102 may have input and output devices 714. These devices may include any sort of output devices known in the art, such as a display (already described as display 712), speakers, a vibrating mechanism, or a tactile feedback mechanism. Output devices may also include ports for one or more peripheral devices, such as headphones, peripheral speakers, or a peripheral display. Input devices may include any sort of input devices known in the art. For example, the input devices may include a microphone, a keyboard/keypad, or a touch-sensitive display (such as the touch-sensitive display screen described above). A keyboard/keypad may be a push button numeric dialing pad (such as on a typical telemobile device), a multi-key keyboard (such as a conventional QWERTY keyboard), or one or more other types of keys or buttons, and may also include a joystick-like controller and/or designated navigation buttons, or the like.

Although features and/or methodological acts are described above, it is to be understood that the appended claims are not necessarily limited to those features or acts. Rather, the features and acts described above are disclosed as example forms of implementing the claims.

What is claimed is:

1. A cellular communication device for use with a cellular communication network, the cellular communication device comprising:
   one or more processors;
   one or more non-transitory computer-readable media;

the one or more non-transitory computer-readable media storing, for each of multiple geographic regions, band prioritization data regarding which of multiple frequency bands should be prioritized during cell discovery by the cellular communication device;

the one or more non-transitory computer-readable media storing computer-executable instructions that, when executed by the one or more processors, cause the one or more processors to perform actions comprising:

determining a geographic coordinate of the cellular communication device, wherein the geographic coordinate corresponds to a geographic region of the multiple geographic regions;

referencing the band prioritization data to determine, for the geographic region, a prioritized frequency band for use during cell discovery; and scanning frequencies of the multiple frequency bands to identify one or more signals of the cellular communication network, wherein of the multiple frequency bands, the scanning is performed first for frequencies of the prioritized frequency band, wherein the band prioritization data specifies, for each of the geographic regions, bandwidths of the frequency bands, and wherein referencing the band prioritization data comprises, for a first frequency band having a first bandwidth in the geographic region and a second frequency band having a second bandwidth in the geographic region, determining whether the first bandwidth exceeds the second bandwidth by more than a predetermined threshold.

2. The cellular communication device of claim 1, wherein:

the band prioritization data comprises ranges of latitudes, each of the ranges corresponding to one of the geographic regions;

determining the geographic coordinate comprises determining a latitude of the cellular communication device; and referencing the band prioritization data comprises determining which of the ranges includes the latitude of the cellular communication device.

3. The cellular communication device of claim 1, wherein the band prioritization data is based at least in part on bandwidths of the frequency bands.

4. The cellular communication device of claim 1, wherein the band prioritization data specifies an order in which the frequency bands are to be scanned.

5. The cellular communication device of claim 1, wherein referencing the band prioritization data comprises comparing, for the geographic region, the bandwidths of the frequency bands.

6. The cellular communication device of claim 1, wherein referencing the band prioritization data comprises determining, for the geographic region, which of the frequency bands has a bandwidth that is greatest.

7. A method to be performed by a cellular communication device, the method comprising:

referencing band prioritization data stored in non-volatile memory of the cellular communication device to determine a prioritized frequency band for a geographic region in which the cellular communication device is located, the prioritized frequency band being one of multiple frequency bands supported by the cellular communication device; and scanning multiple frequencies to identify one or more signals of a cellular communication network, wherein the scanning is performed first for frequencies of the prioritized frequency band, wherein the band prioritization data specifies, for the geographic region, bandwidths of the frequency bands, and wherein referencing the band prioritization data comprises, for a first frequency band having a first bandwidth in the geographic region and a second frequency band having a second bandwidth in the geographic region, determining whether the first bandwidth exceeds the second bandwidth by more than a predetermined threshold.

8. The method of claim 7, further comprising determining a geographic coordinate of the cellular communication device, wherein referencing the band prioritization data comprises using the geographic coordinate to look up the prioritized frequency band in the band prioritization data.

9. The method of claim 7, further comprising:

determining a geographic latitude of the cellular communication device;

wherein the band prioritization data comprises ranges of geographic latitudes, each of the ranges corresponding to a geographic region; and referencing the band prioritization data comprises determining which of the ranges includes the geographic latitude of the cellular communication device.

10. The method of claim 7, wherein the band prioritization data is based at least in part on bandwidths of each of the frequency bands.

11. The method of claim 7, wherein the band prioritization data specifies an order in which the frequency bands are to be scanned.

12. The method of claim 7, wherein referencing the band prioritization data comprises comparing, for the geographic region, the bandwidths of the frequency bands.

13. The method of claim 7, wherein referencing the band prioritization data comprises, for a first frequency band having a first bandwidth in the geographic region and a second frequency band having a second bandwidth in the geographic region, determining which of the first bandwidth and the second bandwidth is greatest.

14. One or more integrated circuits for use by a cellular communication device, the one or more integrated circuits comprising:

one or more processors;

one or more non-transitory computer-readable media;

the one or more non-transitory computer-readable media storing band prioritization data indicating, for each of multiple geographic regions, which of multiple frequency bands should be prioritized during cell discovery;

the one or more non-transitory computer-readable media storing computer-executable instructions that, when executed by the one or more processors, cause the one or more processors to perform actions comprising:

determining a location of the cellular communication device;

referencing the band prioritization data to determine, for a geographic region corresponding to the location of the cellular communication device, a prioritized frequency band; and scanning frequencies of the multiple frequency bands to identify one or more signals of a cellular communication network, wherein of the multiple frequency bands, the scanning is performed first for frequencies of the prioritized frequency band, wherein the band prioritization data specifies, for the geographic region, bandwidths of the frequency bands, and wherein referencing the band prioritization data comprises, for a first frequency band having a first bandwidth in the geographic region and a second frequency band having a second bandwidth in the geographic region, determining whether the first bandwidth exceeds the second bandwidth by more than a predetermined threshold.

15. The one or more integrated circuits of claim 14, wherein the band prioritization data is based at least in part on bandwidths of the frequency bands.

16. The one or more integrated circuits of claim 14, wherein:

the band prioritization data comprises ranges of latitudes, each of the ranges corresponding to one of the geographic regions;

determining the location of the cellular communication device comprises determining a latitude of the cellular communication device; and referencing the band prioritization data comprises determining which of the ranges includes the latitude of the cellular communication device.

* * * * *